US012736972B2

(12) United States Patent
Tweedy et al.

(10) Patent No.: US 12,736,972 B2
(45) Date of Patent: Sep. 15, 2026

(54) SYSTEM AND METHOD FOR REMOTE OPERATION OF VEHICLE FOR COUPLING OR DECOUPLING VEHICLE AND TRAILER

(71) Applicant: Torc Robotics, Inc., Blacksburg, VA (US)

(72) Inventors: Phillip Tweedy, Blacksburg, VA (US); Troy Aaron Rucker, Blacksburg, VA (US)

(73) Assignee: TORC ROBOTICS, INC., Blacksburg, VA (US)

( * ) Notice: Subject to any disclaimer, the term of this patent is extended or adjusted under 35 U.S.C. 154(b) by 134 days.

(21) Appl. No.: 18/405,342

(22) Filed: Jan. 5, 2024

(65) Prior Publication Data

US 2025/0224726 A1 Jul. 10, 2025

(51) Int. Cl.

| | |
|---|---|
| ***G05D 1/223*** | (2024.01) |
| ***G05D 1/227*** | (2024.01) |
| ***G05D 1/65*** | (2024.01) |
| ***G05D 1/656*** | (2024.01) |
| ***G05D 109/10*** | (2024.01) |
| ***G05D 111/30*** | (2024.01) |

(52) U.S. Cl.

CPC ............. *G05D 1/223* (2024.01); *G05D 1/227* (2024.01); *G05D 1/65* (2024.01); *G05D 1/656* (2024.01); *G05D 2109/10* (2024.01); *G05D 2111/30* (2024.01)

(58) Field of Classification Search

CPC .......... G05D 1/223; G05D 1/227; G05D 1/65; G05D 1/656; G05D 2109/10; G05D 2111/30

See application file for complete search history.

(56) References Cited

U.S. PATENT DOCUMENTS

| | | | | |
|---|---|---|---|---|
| 10,160,436 | B2 | 12/2018 | Malone et al. | |
| 2002/0003341 | A1* | 1/2002 | Hall | B60D 1/28 280/423.1 |
| 2002/0089147 | A1* | 7/2002 | Shilitz | B60D 1/36 280/470 |
| 2007/0090688 | A1 | 4/2007 | Haemmerling et al. | |
| 2013/0211623 | A1* | 8/2013 | Thompson | H04L 67/12 701/1 |
| 2015/0166007 | A1* | 6/2015 | Hong | B60R 25/10 701/2 |
| 2017/0111487 | A1* | 4/2017 | Musial | H04W 12/068 |
| 2019/0202421 | A1* | 7/2019 | Healy | F16D 61/00 |
| 2020/0097021 | A1* | 3/2020 | Carpenter | B62D 15/0285 |

(Continued)

*Primary Examiner* — Dale W Hilgendorf
*Assistant Examiner* — Frank T Glenn, III
(74) *Attorney, Agent, or Firm* — Armstrong Teasdale LLP

(57) ABSTRACT

A system includes an in-vehicle controller configured to mount to a vehicle and connect to the drive system of the vehicle, and a remote control configured to send signals to the in-vehicle controller. The remote control includes an input device that is configured to receive commands from a user relating to operation of the vehicle to couple a trailer to the vehicle or decouple the trailer from the vehicle while the user is outside the vehicle and the vehicle and trailer are in a field of view of the user. The signals are based on the user commands and are configured to cause the in-vehicle controller to move the vehicle forward or backward; steer the vehicle; stop movement of the vehicle; and stop movement of the trailer.

18 Claims, 6 Drawing Sheets

(56) References Cited

U.S. PATENT DOCUMENTS

| | | | | |
|---|---|---|---|---|
| 2021/0116907 | A1* | 4/2021 | Altman | G05D 1/223 |
| 2021/0302189 | A1* | 9/2021 | Buddharaju | H04W 4/027 |
| 2022/0161616 | A1* | 5/2022 | Golgiri | B60D 1/36 |
| 2022/0382275 | A1* | 12/2022 | Martin | G05D 1/0016 |
| 2022/0390942 | A1* | 12/2022 | Lavoie | B60W 30/18145 |
| 2023/0236593 | A1* | 7/2023 | Overfield | G05D 1/0016<br>701/2 |
| 2023/0286451 | A1 | 9/2023 | Bauer et al. | |

* cited by examiner 112c
112c
112a 112b
114
118b
100
118a

SYSTEM AND METHOD FOR REMOTE OPERATION OF VEHICLE FOR COUPLING OR DECOUPLING VEHICLE AND TRAILER

TECHNICAL FIELD

The field of the disclosure relates generally to remote operation of vehicles and, more specifically, to remote operation of a vehicle for coupling the vehicle to a trailer or decoupling the vehicle from the trailer.

BACKGROUND

Vehicles such as trucks may be used to move trailers between locations. Typically, the trailers are coupled to the vehicle or uncoupled from the vehicle at a launching/receiving station or hub. However, coupling and uncoupling the vehicle and the trailer requires several actions such as moving the vehicle, raising and lowering a suspension system, moving coupling components, and unlocking or locking the coupling components. A person may perform at least some of these actions by entering and exiting the cab repeatedly. However, each time a person enters or exits the vehicle poses a risk of injury, e.g., the person may slip and fall, and increases the time required to couple or decouple the vehicle and the trailer. In addition, the operator may be unable to see relevant portions of the vehicle and the trailer when inside the cab and there may be an increased risk of operator error during the process. Accordingly, the person may have to repeatedly inspect the position of the vehicle and the trailer, manipulate components of the vehicle and the trailer, and make incremental corrections to the position until a satisfactory connection is made. As a result, the process for launching and receiving vehicles at a station or hub is time consuming and poses an increased risk of injury to persons or damage to equipment.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY

In one aspect, a system for operating a vehicle includes an in-vehicle controller configured to mount to the vehicle and connect to a drive system of the vehicle, and a remote control communicatively connected to the in-vehicle controller and configured to send signals to the in-vehicle controller. The remote control includes an input device that is configured to receive commands from a user. The commands relate to operation of the vehicle to couple a trailer to the vehicle or decouple the trailer from the vehicle while the user is outside the vehicle and the vehicle and trailer are in a field of view of the user. The remote control sends the signals based on the user commands. The signals are configured to cause the in-vehicle controller to move the vehicle forward or backward; steer the vehicle; stop movement of the vehicle; and stop movement of the trailer.

In another aspect, a method of remotely operating a vehicle to couple a trailer to the vehicle or decouple the trailer from the vehicle includes receiving a user input via an input device of a remote control. The remote control is configured for a user to operate the vehicle to couple the trailer to the vehicle or decouple the trailer from the vehicle while the user is outside the vehicle and the vehicle and trailer are in a field of view of the user. The method also includes sending signals from the remote control to an in-vehicle controller mounted to the vehicle, wherein the signals are configured to move the vehicle forward or backward; steer the vehicle; stop movement of the vehicle; and stop movement of the trailer.

In yet another aspect, a remote control for remotely operating a vehicle to couple a trailer to the vehicle or decouple the trailer from the vehicle includes an input device that is configured to receive commands from a user. The commands relate to operation of the vehicle to couple the trailer to the vehicle or decouple the trailer from the vehicle while the user is outside the vehicle and the vehicle and trailer are in a field of view of the user. The remote control also includes a transceiver configured to send signals to the vehicle. The transceiver sends the signals based on the user commands received via the input device. The signals are configured to move the vehicle forward or backward; steer the vehicle; stop movement of the vehicle; and stop movement of the trailer.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
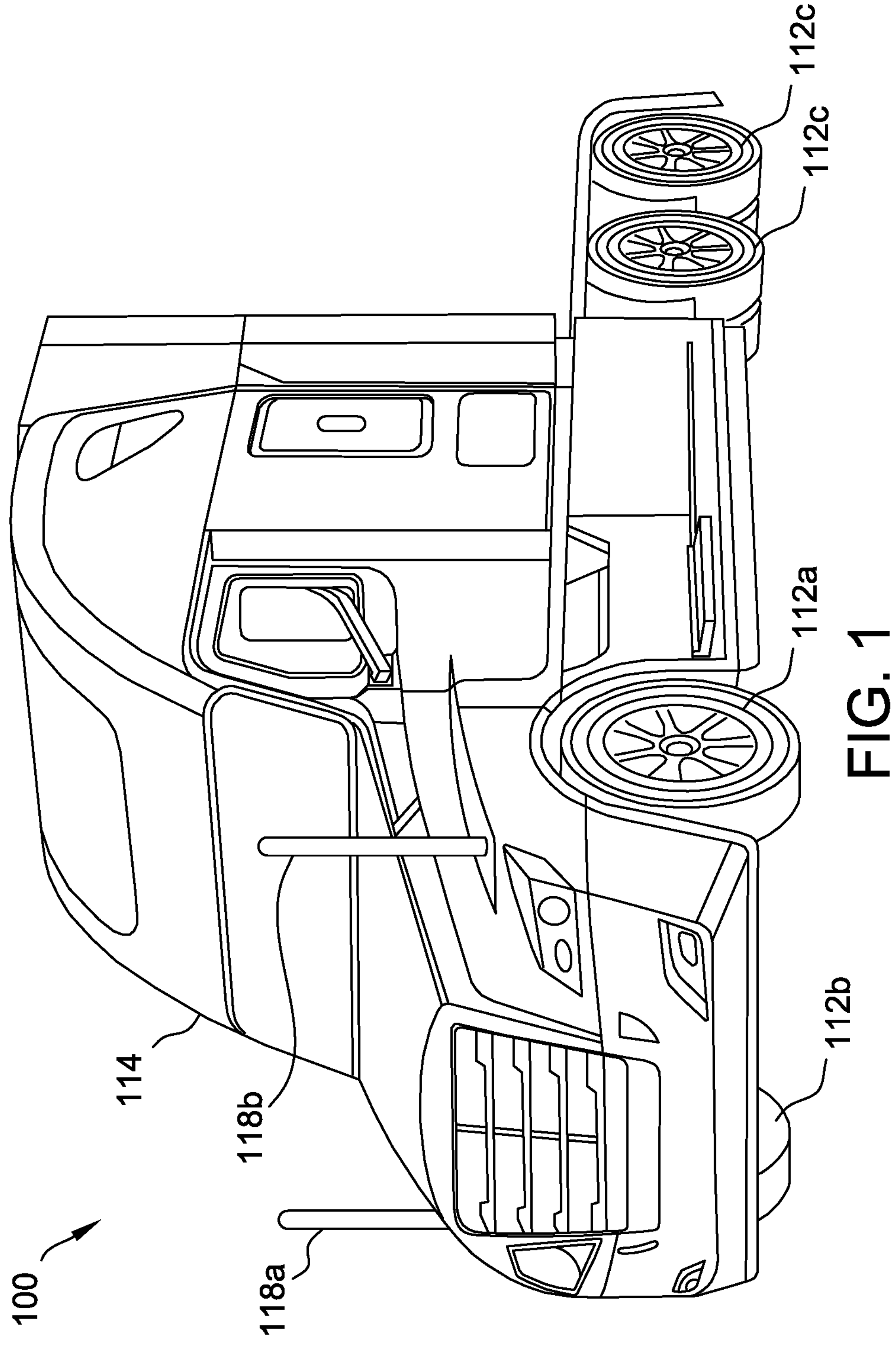
FIG. 1 is a schematic view of a vehicle such as a truck.

Corresponding reference characters indicate corresponding parts throughout the several views of the drawings. Although specific features of various examples may be shown in some drawings and not in others, this is for convenience only. Any feature of any drawing may be reference or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure. The following terms are used in the present disclosure as defined below.

An autonomous vehicle: An autonomous vehicle is a vehicle that is able to operate itself to perform various operations such as controlling or regulating acceleration, braking, or steering wheel positioning, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane or parking the vehicle without human intervention. A semi-autonomous vehicle has an autonomy level of level-1, level-2, or level-3 recognized by NHTSA.

A non-autonomous vehicle: A non-autonomous vehicle is a vehicle that is driven by a human driver. A non-autonomous vehicle is neither an autonomous vehicle nor a semi-autonomous vehicle. A non-autonomous vehicle has an autonomy level of level-0 recognized by NHTSA.

A smart vehicle: A smart vehicle is a vehicle installed with on-board computing devices, one or more sensors, one or more controllers, or one or more internet-of-things (IoT) devices which enables the vehicle to receive or transmit data to another vehicle or a server.

Embodiments of the present application include a system for remotely operating a vehicle for coupling the vehicle to a trailer or decoupling the vehicle from the trailer. For example, the system includes a remote control that is configured to communicate with an in-vehicle controller to operate the vehicle. For example, the remote control sends commands to the in-vehicle controller and the in-vehicle controller causes the vehicle to move the vehicle forward or backward; steer the vehicle; stop movement of the vehicle; stop movement of the trailer; raise or lower a suspension system on the vehicle; release a trailer lock; or change a position of a coupling device on the vehicle. As a result, a user is able to use the remote control to operate the vehicle for coupling or uncoupling the vehicle. Suitably, the remote control is paired with the vehicle and has a range that facilitates the user operating the vehicle while the user is outside the cab of the vehicle but the vehicle and the trailer are within the field of view of the user.

FIG. 1 illustrates a vehicle 100 which may include a truck that may further be connected to a single or tandem trailer 104 (shown in FIG. 2) to transport the trailer 104 to a desired location. The vehicle 100 may be an autonomous vehicle, a non-autonomous vehicle, or a smart vehicle. The vehicle 100 includes a cab 114 that can be supported by, and steered in, the required direction by front wheels 112*a*, 112*b*, and rear wheels 112*c* that are partially shown in FIG. 1. The wheels 112*a*, 112*b* are positioned by a steering system that includes a steering wheel and a steering column (not shown in FIG. 1). The steering wheel and the steering column may be located in the interior of cab 114. An in-vehicle controller may be located in the interior of cab 114 (not shown in FIG. 1). One or more antennas 118*a*, 118*b* may be positioned on the cab 114. By way of a non-limiting example, the one or more antennas 118*a*, 118*b* may be omnidirectional antennas, directional antennas, or sector antennas. The one or more antennas 118*a*, 118*b* may be positioned on the roof of the cab 114 or on the hood of the cab 114 such that the mobile devices or smart vehicles surrounding the autonomous vehicle may communicate with the vehicle 100.

Figure 2:
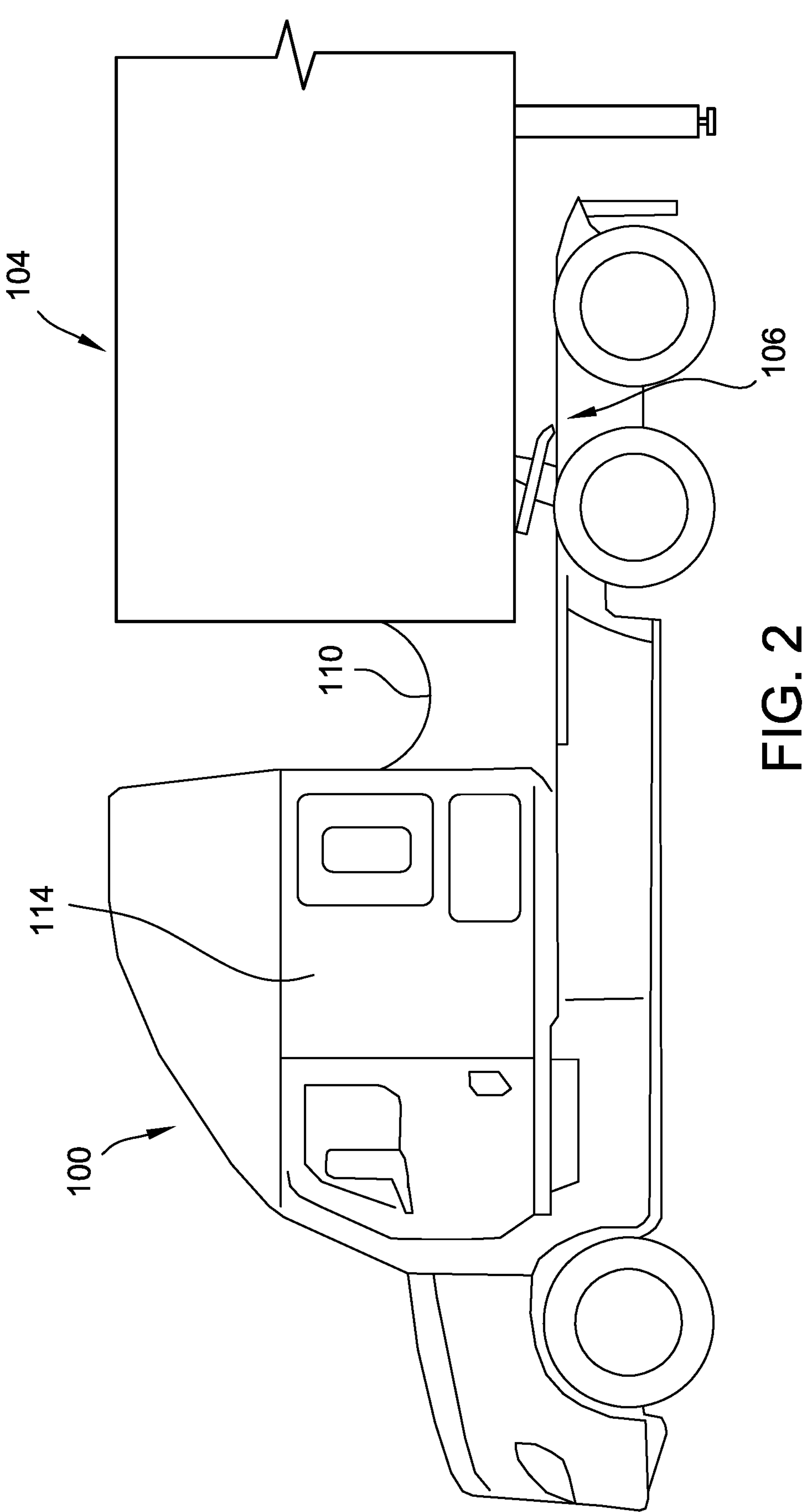
FIG. 2 is a schematic side view of the vehicle of FIG. 1, and a portion of a trailer configured to couple to the vehicle.

FIG. 2 is a schematic side view of the vehicle 100, and a portion of the trailer 104 coupled to the vehicle 100. The trailer 104 may include a compartment, wheels, supports, connectors, lights, shock absorbers, pneumatics, or any other components. The trailer 104 is configured to couple behind and be moved by the vehicle 100. For example, the trailer 104 includes a connector 106 such as a fifth wheel, a hitch, or any suitable connector. The connector 106 extends into and engages to a receiver 108 on the vehicle 100. The connector 106 and the receiver 108 form a coupling device of the vehicle 100 and secure the trailer 104 to the vehicle 100 for movement with the vehicle 100. In some embodiments, the connector 106 is included on the vehicle 100 and the receiver 108 is included on the trailer 104. The vehicle 100 may include lines and components extending between the vehicle 100 and the trailer 104 when the trailer 104 is coupled to the vehicle 100. For example, a pneumatic line 110 may extend from the vehicle 100 to the trailer 104 for regulation of a pneumatic system on the trailer 104.

The position of the receiver 108 may be moved to facilitate connection of the vehicle 100 to the trailer 104. For example, the receiver 108 may be moved forward or backward to facilitate aligning a load point of the trailer 104 on the vehicle or adjusting a position of the trailer 104 relative to the cab 114 of the vehicle 100. In addition, a suspension system on the vehicle 100 may be adjusted to raise or lower height of the vehicle 100. Moreover, the vehicle 100 may be moved forward, backward, steered, and stopped to facilitate connection of the trailer 104 to the vehicle 100. In conventional systems, a driver may perform at least some of these actions by entering and exiting the cab 114 repeatedly, inspecting the position of the vehicle 100 and the trailer 104, manipulating components of the vehicle 100 and the trailer 104, and making incremental corrections to the position until a satisfactory connection is made. In contrast, as described herein, the vehicle 100 may be operated from outside of the cab 114 to couple/decouple the vehicle 100 and the trailer 104 without the operator entering the interior of the cab 114.

Figure 3:
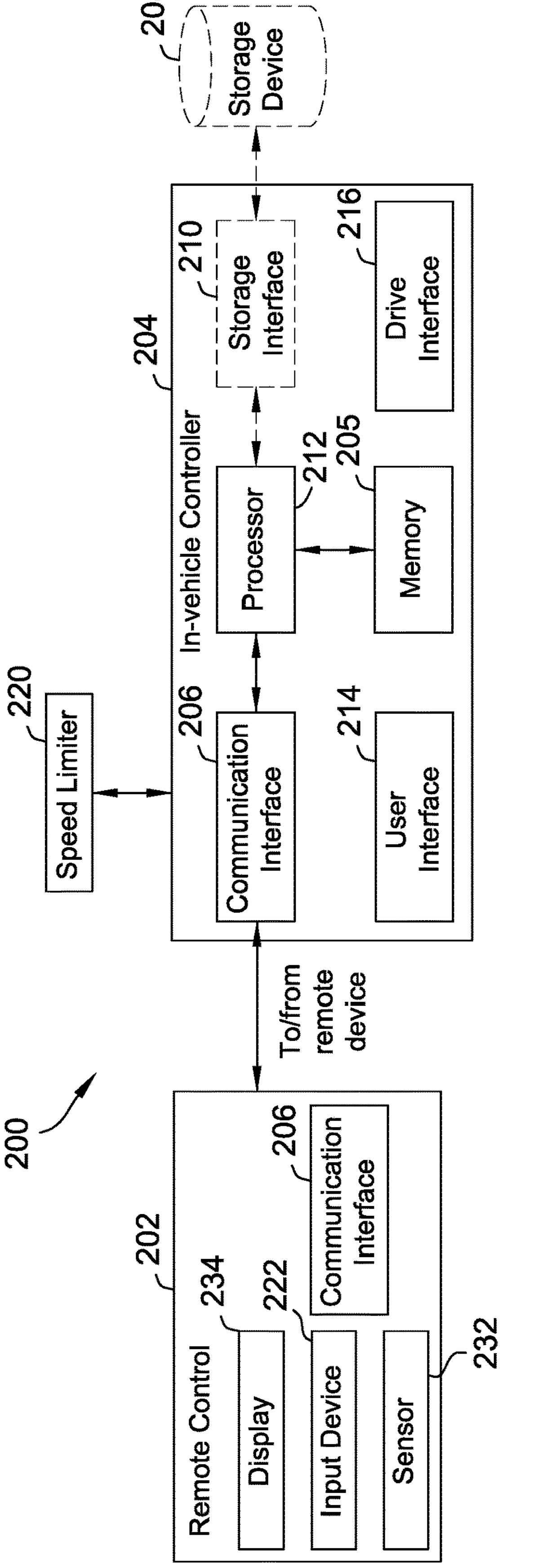
FIG. 3 is a schematic block diagram of a system for remote operation of the vehicle of FIG. 1.

FIG. 3 is a schematic block diagram of a system 200 for remote operation of the vehicle 100 shown in FIG. 1. The system 200 facilitates a user operating the vehicle 100 to couple the vehicle 100 to the trailer 104 or decouple the vehicle 100 from the trailer 104 while the user is outside the cab 114 (shown in FIG. 1) and the vehicle 100 and the trailer 104 are in the field of view of the user. As a result, the user is able to couple the vehicle 100 to the trailer 104 or decouple the vehicle 100 from the trailer 104 in a shorter amount of time and with a reduced risk of injury to people or damage to equipment.

The system 200 includes a remote control 202 and an in-vehicle controller 204. The remote control 202 and the in-vehicle controller 204 are configured to exchange signals to facilitate operation of the vehicle 100. For example, the remote control 202 or the in-vehicle controller 204 include a communication interface 206, e.g., transceivers, such that the remote control 202 or the in-vehicle controller 204 are capable of communicating with each other and other devices, such as a remote application server, a user equipment, a mobile device, a smart vehicle, a mission control or a central hub, or another computing device. The communication interface 206 sends and receives signals using, for example, wireless communication or data transmission over one or more radio links or digital communication channels using one or more of a Wi-Fi protocol, a Radio Frequency Identification (RFID) protocol, or a Near-Field Communication (NFC) protocol. In the example, the remote control 202 and the in-vehicle controller 204 are paired together and are configured to communicate wirelessly with each other using, for example, a short-distance RFID protocol. For example, the remote control 202 has a communication range of 20 meters or less. The signals sent by the remote control 202 may include an identifier that is associated with the vehicle 100 or the remote control 202 to facilitate secure pairing and communication between the vehicle 100 and the remote control 202.

The in-vehicle controller 204 or the remote control 202 may include a computing device(s) including one or more processing units or processors 212 (e.g., in a multi-core configuration). The processor 212 may be operatively coupled to the communication interface 206. The processor 212 may also be operatively coupled to a storage device 208 or a memory 205. The storage device 208 may be any computer-operated hardware suitable for storing or retrieving data, such as, but not limited to, data associated with historic databases. In some embodiments, storage device 208 may be integrated in the computing device. For example, the computing device may include one or more hard disk drives as storage device 208 or the memory 205.

In other embodiments, storage device 208 may be external to the computing device and may be accessed by a using a storage interface 210. For example, storage device 208 may include a storage area network (SAN), a network attached storage (NAS) system, or multiple storage units such as hard disks or solid-state disks in a redundant array of inexpensive disks (RAID) configuration.

In some embodiments, the processor 212 may be operatively coupled to the storage device 208 via the storage interface 210. The storage interface 210 may be any component capable of providing the processor 212 with access to the storage device 208. The storage interface 210 may include, for example, an Advanced Technology Attachment (ATA) adapter, a Serial ATA (SATA) adapter, a Small Computer System Interface (SCSI) adapter, a RAID controller, a SAN adapter, a network adapter, or any component providing the processor 212 with access to the storage device 208.

The processor 212 may execute computer-executable instructions for implementing aspects of the disclosure. In some embodiments, the processor 212 may be transformed into a special purpose microprocessor by executing computer-executable instructions or by otherwise being programmed. In some embodiments, and by way of a non-limiting example, the memory 205 may include instructions to perform specific operations.

The remote control 202 is communicatively connected to the in-vehicle controller 204 and configured to send signals relating to operation of the vehicle 100 (shown in FIG. 1) to the in-vehicle controller 204. For example, the remote control 202 includes an input device 222 that is configured to receive commands from a user. For example and without limitation, the commands relate to operation of the vehicle to couple a trailer to the vehicle or decouple the trailer from the vehicle while the user is outside the vehicle and the vehicle and trailer are in a field of view of the user. The remote control 202 sends the signals based on the user commands, and the signals are configured to cause the in-vehicle controller 204 to steer the vehicle 100 (shown in FIG. 1); stop movement of the vehicle 100; stop movement of the trailer 104 (shown in FIG. 2); raise or lower a suspension system on the vehicle 100; release a trailer lock; or change a position of a coupling device on the vehicle 100.

Figure 4:
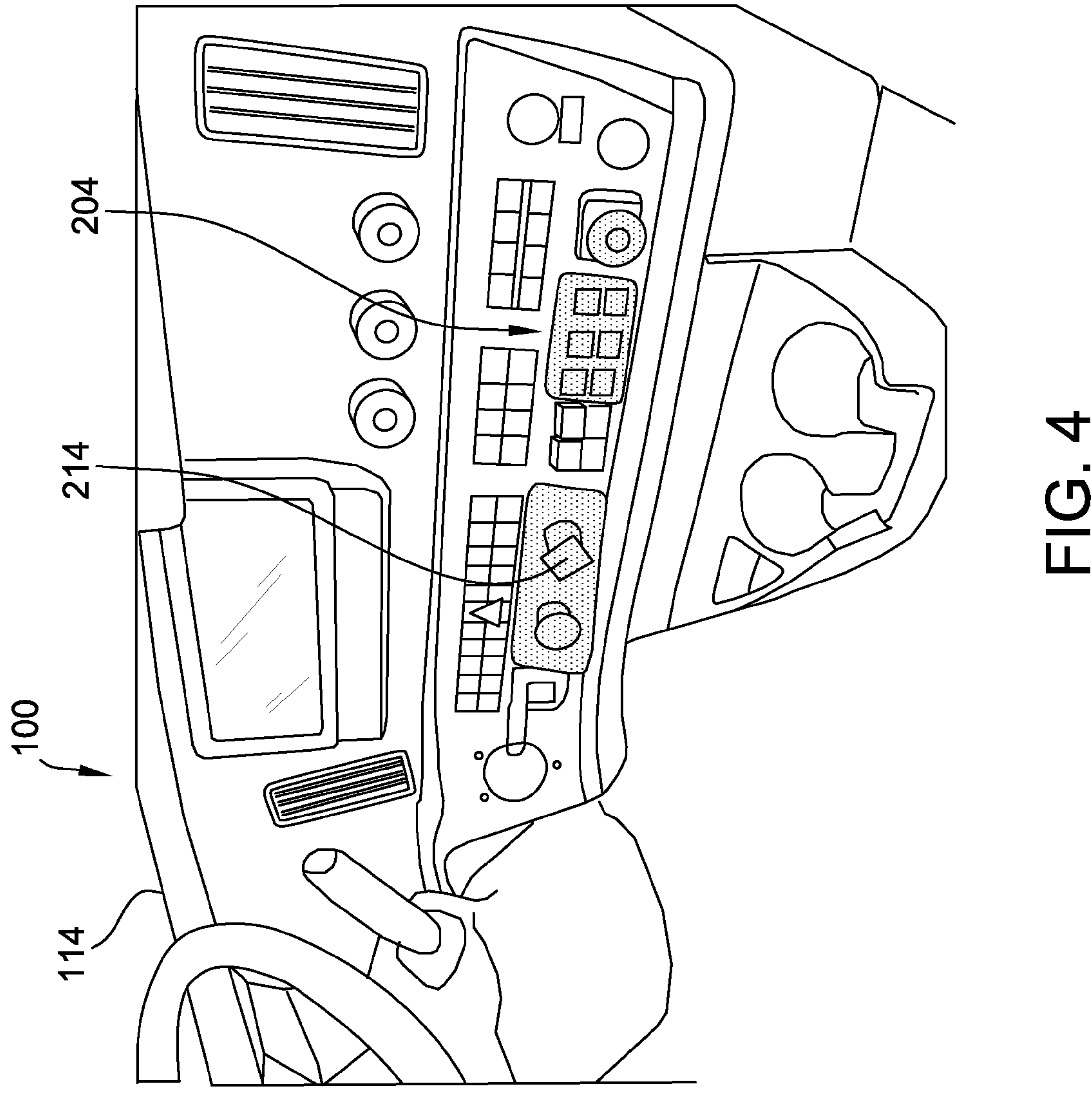
FIG. 4 is a perspective view of an interior of a cab of the vehicle of FIG. 1, illustrating a portion of an in-vehicle controller.

FIG. 4 is a perspective view of an interior of the cab 114 of the vehicle 100 of FIG. 1, illustrating a portion of the in-vehicle controller 204. The in-vehicle controller 204 is mounted at least partly within the cab 114 of the vehicle 100 and is accessible by a user. For example, the in-vehicle controller 204 includes a user interface 214 mounted within the cab 114 of the vehicle. The user interface 214 is configured to receive a user input to switch the vehicle 100 between a normal mode of control and a remote control mode of operation in which the in-vehicle controller 204 is configured to act on the signals received from the remote control 202. The in-vehicle controller 204 or the remote control 202 may include one or more indicators (e.g., lights, screens, speakers) that indicate a status of the vehicle (e.g., a selected mode of the vehicle).

In some embodiments, the in-vehicle controller 204 switches an operating mode of the vehicle 100 at least in part autonomously when, for example, a safety anomaly is detected, a remote connection is lost or unstable, or when a person within the cab 114 manually engages a drive system of the vehicle 100. For example, during operation, the in-vehicle controller 204 receives an awake or active signal from the remote control 202 at a predetermined time to confirm that the remote control 202 is active and that the wireless connection is stable. The in-vehicle controller 204 is configured to switch an operating state of the vehicle 100 from the remote control mode to, for example, a parked operating state, if the in-vehicle controller 204 does not receive the active signal within the predetermined time. In other embodiments, the vehicle 100 may have any suitable operating states and switch between the operating states based on user inputs or at least partly autonomously.

In addition, the in-vehicle controller 204 includes a drive interface 216 that is configured to interact with the drive system to cause the drive system to perform user commands when the vehicle 100 is in the remote control mode. For example, the drive interface 216 is configured to selectively send signals that relate to operation of the vehicle to the drive system of the vehicle 100. The signals cause the drive system to steer the vehicle 100; stop movement of the vehicle; stop movement of the trailer; raise or lower a suspension system on the vehicle; release a trailer lock; or change a position of a coupling device on the vehicle. In addition, based on the signals, the drive system of the vehicle may manipulate components of the drive system such as a steering column of the drive system, switches, brakes, locks, or a suspension system.

In addition, in some embodiments, the in-vehicle controller 204 includes a speed limiter 220 (shown in FIG. 3) that prevents the vehicle from traveling above a threshold or maximum speed when the vehicle 100 is in the remote control mode. For example, the speed limiter 220 may restrict the vehicle 100 to a maximum speed of 5 miles per hour (mph) or 3 mph. The maximum speed facilitates safe operation of the vehicle 100 by preventing the vehicle 100 traveling above the speed necessary to maneuver for coupling/decoupling the trailer 104 (shown in FIG. 2).

Figure 5:
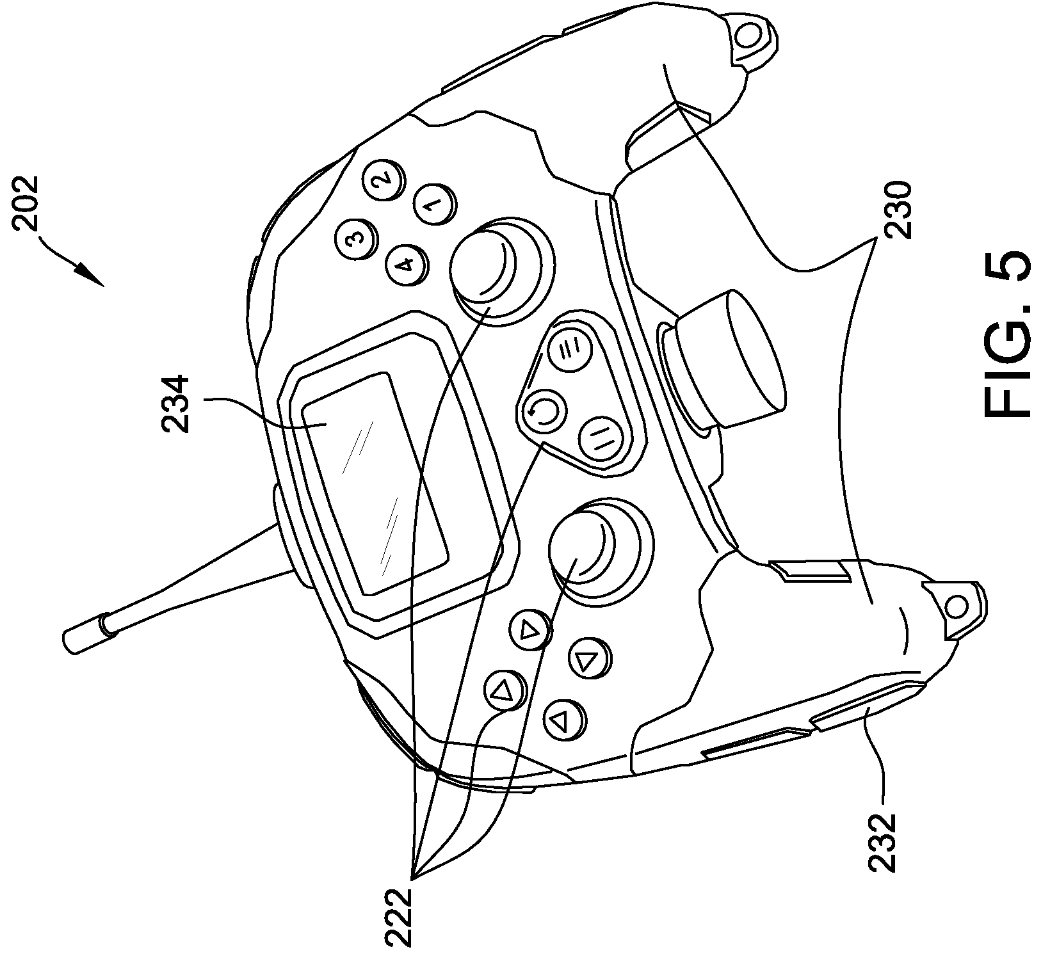
FIG. 5 is a perspective view of an example remote control for use with the system of FIG. 3.

FIG. 5 is a perspective view of an example remote control 202 for use with the system 200 of FIG. 3. In other embodiments, the remote control 202 may include a mobile device, a tablet, a smartwatch, a laptop, a smart glass, an internet-of-things (IoT) device, or any suitable computing device that can pair with the in-vehicle controller 204 or another device coupled to the in-vehicle controller 204.

In the example, the remote control 202 is handheld. For example, the remote control 202 includes one or more grips 230 that are sized and shaped to be grasped by a user. In addition, in the example, the remote control includes a sensor 232 arranged to detect when the user grasps the remote control 202. The sensor 232 acts as a dead man lock and the remote control is configured to send an active signal to the in-vehicle controller at predetermined intervals when the sensor 232 detects that the user is grasping the remote control. The in-vehicle controller is configured to switch an operating mode of the vehicle if the in-vehicle controller does not receive the active signals from the remote control 202 at the predetermined intervals.

The remote control 202 includes a plurality of input devices 222 that receive the user commands for operating the vehicle 100 (shown in FIG. 1) in the remote control mode. For example, the input devices 222 may include one or more of the following: a joystick, a toggle switch, a button, a wheel, a touchscreen, or a virtual actuator. In the example, the input devices 222 include joysticks and buttons. The user manipulates the input devices 222 to provide user commands to remotely operate the vehicle. For example, the user may manipulate the input devices 222 to provide directional commands (forward, backward, left, and right), speed commands, brake commands, and suspension adjustments. The input devices 222 are intuitive and provide simplified operation of the vehicle 100 to facilitate easier remote operation of the vehicle 100. The remote control 202 is able to provide a simplified interface (e.g., the remote control 202 does not include the complete number of vehicle controls available within the cab 114 of the vehicle 100) because the system 200 includes safety features such as the speed limiter 220 and dead man lock.

Also, the remote control 202 includes a display 234 that is configured to display at least one of a battery status, an operational status of the vehicle, feedback relating to user commands, connection status, or any other information. The display 234 may be a touchscreen or non-touchscreen. In other embodiments, the remote control 202 includes a light, speaker, screen, or any other suitable feedback devices.

Figure 6:
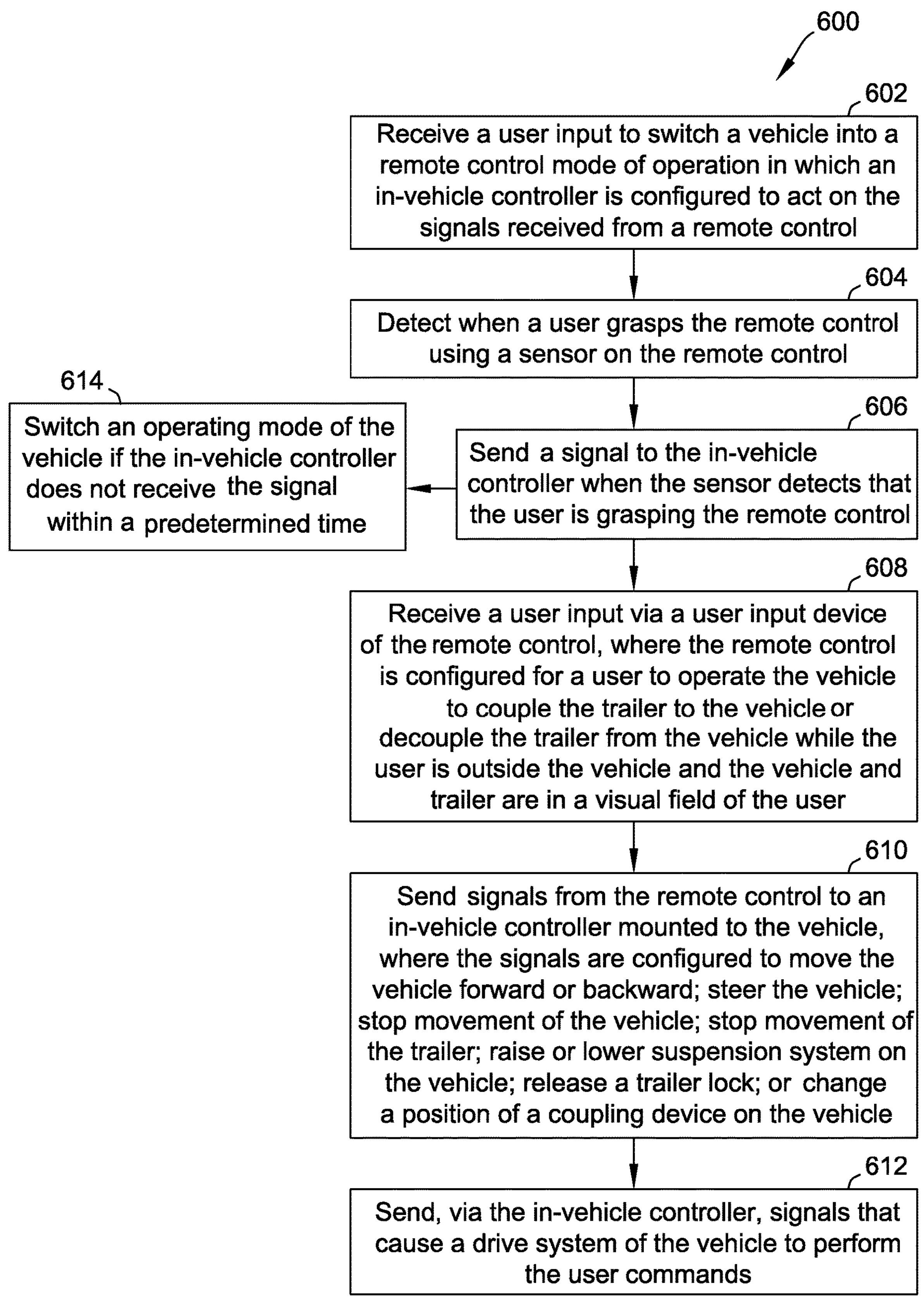
FIG. 6 is a flow chart of an example method of remotely operating the vehicle of FIG. 1.

FIG. 6 is a flow chart of an example method 600 of remotely operating a vehicle. Referring to FIGS. 2, 3, 5, and 6, the system 200 may be used in accordance with the method 600 to remotely operate the vehicle 100 to couple the trailer 104 to the vehicle 100 or decouple the trailer 104 from the vehicle 100. For example, the method 600 is used to maneuver the vehicle 100 relative to the trailer 104 or adjust coupling components on the vehicle to facilitate coupling/decoupling the trailer 104 from the vehicle 100. For example, the vehicle 100 and the trailer 104 are coupled/decoupled at a hub or transport location.

Initially, the vehicle 100 receives 602 a user input to switch the vehicle 100 into a remote control mode of operation. In the remote control mode, the in-vehicle controller 204 is configured to act on signals received from the remote control 202 paired with the in-vehicle controller 204. For example, a user may actuate a switch within the cab 114 of the vehicle 100 to switch the mode of operation of the vehicle 100 to the remote control mode. In some embodiments, the in-vehicle controller 204 may automatically switch operating modes of the vehicle 100. For example, the sensors on the remote control 202 detect 604 when the user grasps the remote control 202 and the remote control 202 sends 606 a signal to the in-vehicle controller 204 when the sensor detects that the user is grasping the remote control 202. The in-vehicle controller 204 is configured to switch 614 an operating mode of the vehicle 100 if the in-vehicle controller 204 does not receive the signals within a predetermined time.

In addition, the remote control 202 receives 608 a user input, e.g., a command, via the input device 222 of the remote control 202, and sends 610 signals based on the commands to the in-vehicle controller 204 mounted to the vehicle 100. In some embodiments, the signals are sent using at least one of a Wi-Fi protocol, an RFID protocol, or a Near-Field Communication (NFC) protocol. The signals relate to user commands for operating the vehicle 100 to couple the trailer 104 to the vehicle 100 or decouple the trailer 104 from the vehicle 100 while the user is outside the vehicle 100 and the vehicle 100 and trailer 104 are in a field of view of the user.

Also, the in-vehicle controller 204 sends 612 signals that cause a drive system of the vehicle 100 to perform the user commands. The signals are configured to move the vehicle 100 forward or backward; steer the vehicle 100; stop movement of the vehicle 100; stop movement of the trailer 104; raise or lower a suspension system on the vehicle 100; release a trailer lock; or change a position of a coupling device on the vehicle 100. For example, the user provides commands via the input devices 222 of the remote control 202 that cause the vehicle 100 to move relative to the trailer 104 or position the coupling device of the vehicle to couple/decouple the vehicle 100 and the trailer 104. In some embodiments, the remote control 202 does not provide additional commands and only provides the necessary commands for coupling or decoupling vehicle 100 and the trailer 104.

In the example, the user provides commands via the remote control 202 to cause the vehicle 100 to move relative to the trailer 104 to a desired position for coupling/decoupling the vehicle 100 and the trailer 104. In addition, the user provides commands via the remote control 202 that cause the coupling device to be adjusted or the suspension system to raise/lower for coupling/decoupling the vehicle 100 and the trailer 104. The coupling mechanism is then engaged/disengaged and locked/unlocked to secure/detach the vehicle 100 and the trailer 104 after or while the user is remotely operating the vehicle 100.

After the vehicle 100 is coupled/decoupled from the trailer 104, the vehicle is switched from the remote control mode to a normal operation mode. The vehicle 100 may then be moved using the drive system in any suitable manner. The trailer 104 moves with the vehicle 100 if the trailer 104 is coupled to the vehicle 100. The trailer 104 may remain parked when the vehicle 100 moves if the trailer 104 is decoupled from the vehicle 100.

Accordingly, the method 600 simplifies hub launching and receiving vehicles 100 and trailers 104. In addition, the method 600 reduces risk of injury to personal and damage to equipment when launching and receiving vehicles 100 and trailers 104.

Some embodiments involve the use of one or more electronic processing or computing devices. As used herein, the terms “processor” and “computer” and related terms, e.g., “processing device,” and “computing device” are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally “configured” to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or a electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary embodiment" are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A system for operating a vehicle, the vehicle including a drive system, the system comprising:
- a connector;
- a receiver; the connector positioned on one of the vehicle or a trailer, the receiver positioned on the other of the vehicle or the trailer;
- an in-vehicle controller configured to mount to the vehicle and connect to the drive system of the vehicle; and
- a remote control communicatively connected to the in-vehicle controller and configured to send signals to the in-vehicle controller, wherein the remote control includes an input device that is configured to receive commands from a user, wherein the commands relate to operation of the vehicle to couple a trailer to the vehicle or decouple the trailer from the vehicle while the user is outside the vehicle and the vehicle and trailer are in a field of view of the user, wherein the remote control sends the signals based on the user commands, and wherein the signals are configured to cause the in-vehicle controller to:
  - adjust a relative position between the connector and the receiver by moving the vehicle forward or backward and adjusting a height of a suspension system on the vehicle;
  - steer the vehicle;
  - release a trailer lock when the relative position is at a desired position of coupling or decoupling the vehicle and the trailer;
  - stop movement of the vehicle; and
  - stop movement of the trailer.

2. The system of claim 1, wherein the remote control further comprises:

one or more grips sized and shaped to be grasped by the user;

a sensor configured to detect a grasp of the one or more grips by the user; and wherein the remote control is configured to send an active signal to the in-vehicle controller when the sensor detects that the user is grasping the remote control, and wherein the in-vehicle controller is configured to switch an operating mode of the vehicle if the in-vehicle controller does not receive the active signal within a predetermined time.

3. The system of claim 1, wherein the in-vehicle controller includes a user interface mounted within a cab of the vehicle, wherein the user interface is configured to receive a user input to switch the vehicle into a remote control mode of operation in which the in-vehicle controller is configured to act on the signals received from the remote control.

4. The system of claim 1, wherein the remote control is paired with the vehicle, and the signals sent by the remote control include an identifier that is associated with the vehicle.

5. The system of claim 1, wherein the in-vehicle controller includes a speed limiter that regulates a speed of the vehicle, wherein the speed limiter regulates a maximum speed for the vehicle.

6. The system of claim 1, wherein the remote control and the vehicle communicate using at least one of a Wi-Fi protocol, an RFID protocol, or a Near-Field Communication (NFC) protocol.

7. The system of claim 1, wherein the remote control includes a plurality of the input devices and a display, wherein the display is configured to display at least one of a battery status, an operational status of the vehicle, feedback relating to user commands, or connection status.

8. The system of claim 1, wherein the input device includes one or more of the following: a joystick, a toggle switch, a button, a wheel, a touchscreen, or a virtual actuator.

9. A method of remotely operating a vehicle to couple a trailer to the vehicle or decouple the trailer from the vehicle, the method comprising:

receiving a user input via an input device of a remote control, wherein the remote control is configured for a user to operate the vehicle to couple the trailer to the vehicle or decouple the trailer from the vehicle while the user is outside the vehicle and the vehicle and trailer are in a field of view of the user; and sending signals from the remote control to an in-vehicle controller mounted to the vehicle, wherein the signals are configured to:

adjust a relative position between a connector and a receiver by moving the vehicle forward or backward and adjusting a height of a suspension system on the vehicle, the connector positioned on the vehicle or the trailer, the receiver positioned on the other of the vehicle or the trailer;

steer the vehicle;

release a trailer lock when the relative position is at a desired position of coupling or decoupling the vehicle and the trailer;

stop movement of the vehicle; and stop movement of the trailer.

10. The method of claim 9, further comprising:

detecting when the user grasps one or more grips of the remote control using a sensor on the remote control, the one or more grips sized and shaped to be grasped by the user, the sensor configured to detect a grasp of the one or more grips by the user; and sending a signal to the in-vehicle controller when the sensor detects that the user is grasping the remote control at the one or more grips, wherein the in-vehicle controller is configured to switch an operating mode of the vehicle if the in-vehicle controller does not receive the signal within a predetermined time.

11. The method of claim 9, further comprising receiving a user input to switch the vehicle into a remote control mode of operation in which the in-vehicle controller is configured to act on the signals received from the remote control.

12. The method of claim 9, further comprising sending signals that relate to operation of the vehicle from the in-vehicle controller to a drive system of the vehicle to perform user commands.

13. The method of claim 9, further comprising regulating via a speed limiter a speed of the vehicle, wherein the speed limiter regulates a maximum speed for the vehicle.

14. The method of claim 9, wherein sending signals from the remote control to the vehicle comprises sending signals from the remote control to the vehicle using at least one of a Wi-Fi protocol, an RFID protocol, or a Near-Field Communication (NFC) protocol.

15. A remote control for remotely operating a vehicle to couple a trailer to the vehicle or decouple the trailer from the vehicle, the remote control comprising:

an input device that is configured to receive commands from a user, wherein the commands relate to operation of the vehicle to couple the trailer to the vehicle or decouple the trailer from the vehicle while the user is outside the vehicle and the vehicle and trailer are in a field of view of the user;

one or more grips sized and shaped to be grasped by the user;

a sensor configured to detect a grasp by the user of the one or more grips;

a transceiver configured to send signals to the vehicle, wherein the transceiver sends the signals based on the user commands received via the input device, wherein the signals are configured to:

move the vehicle forward or backward;

steer the vehicle;

stop movement of the vehicle; and stop movement of the trailer, wherein the remote control is configured to send the signals to an in-vehicle controller of the vehicle when the sensor detects that the user is grasping the remote control at the one or more grips, and wherein the in-vehicle controller is configured to switch an operating mode of the vehicle if the in-vehicle controller does not receive the signals within a predetermined time, wherein the signals are further configured to cause the in-vehicle controller to:

adjust a relative position between a connector and a receiver by moving the vehicle forward or backward and adjusting a height of a suspension system on the vehicle, wherein the connector is positioned on one of the vehicle or the trailer, the receiver positioned on the other of the vehicle or the trailer; and release a trailer lock when the relative position is at a desired position of coupling or decoupling the vehicle and the trailer.

16. The remote control of claim 15, wherein the remote control communicates using at least one of a Wi-Fi protocol, an RFID protocol, or a Near-Field Communication (NFC) protocol.

17. The remote control of claim 15, wherein the remote control includes a plurality of the input devices and a display, wherein the display is configured to display at least one of a battery status, an operational status of the vehicle, feedback relating to user commands, or connection status.

18. The remote control of claim 17, wherein the input device includes one or more of the following: a joystick, a toggle switch, a button, a wheel, a touchscreen, or a virtual actuator.

* * * * *